Oct. 20, 1925.
H. FORD
BRAKE
Filed May 31, 1924
1,557,575
2 Sheets-Sheet 1
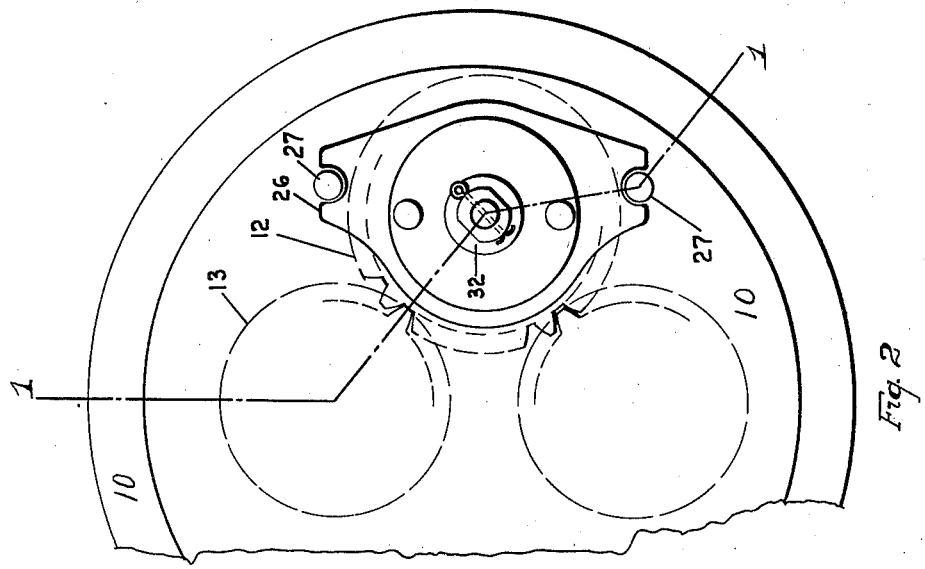
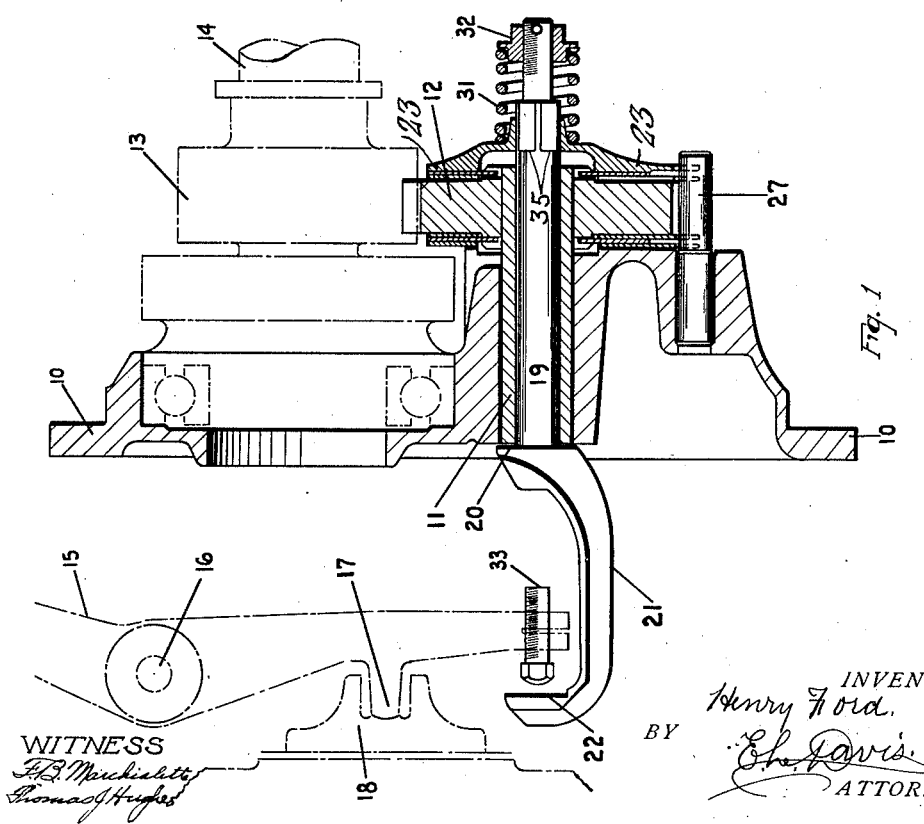
WITNESS
INVENTOR
Henry Ford.
BY
ATTORNEY Oct. 20, 1925.

H. FORD 1,557,575

BRAKE

Filed May 31. 1924

WITNESS

INVENTOR
Henry Ford.
BY
ATTORNEY

Patented Oct. 20, 1925.

1,557,575

UNITED STATES PATENT OFFICE.

HENRY FORD, OF DEARBORN, MICHIGAN.

BRAKE.

Application filed May 31, 1924. Serial No. 716,990.

*To all whom it may concern:*

Be it known that I, HENRY FORD, a citizen of the United States, residing at Dearborn, in the county of Wayne, State of Michigan, have invented new and useful Improvements in a Brake, of which the following is a specification.

The object of my invention is to provide new and useful improvements in a brake for tractors of simple, durable, and inexpensive construction.

A further object of my invention is to provide a brake which is particularly adapted for use in connection with the transmission of a tractor or other automotive vehicle. More especially, it is my desire to provide an adequate efficient brake for use in connection with the transmission such as is shown in my United States Letters Patent 1,347,690, issued July 27th, 1920 and covering a transmission mechanism for tractors. In this connection it will be noted that it is advisable to have all moving parts, and in fact all parts, enclosed or housed, which are used in connection with a tractor, as there is a large amount of dust and dirt ordinarily associated with the use of such tractors and the enclosure of the parts tends to protect both the parts and the operators. Furthermore, it is desirable in such a brake to so construct it that it will be efficient and yet make it unnecessary to change materially the parts of the transmission in order to install the brake. It will be understood that very large numbers of the transmissions described in the above mentioned patent have been manufactured and sold so that my invention as described in this application contemplates a brake that also may be used for replacement in connection with transmissions of that type which have already been sold.

A further object of my invention is to provide a brake which will be operated by the same lever which operates the clutch of the vehicle so that the brake can only be operated when the clutch is disengaged and so that it will not be necessary to provide an additional operating lever for the brake.

With these and other objects in view, my invention consists in the arrangement, combination, and construction of the various parts of my improved device, as described in the specification, claimed in my claims, and shown in the accompanying drawings, in which:

Figure 1 shows a sectional view taken on the line 1—1 of Figure 2.

Figure 2 shows an elevation of the parts illustrated in Figure 1, in both of these views the parts which are associated with my brake mechanism being illustrated in broken lines in order to properly show the construction and connections of my improved brake mechanism.

Figure 3:
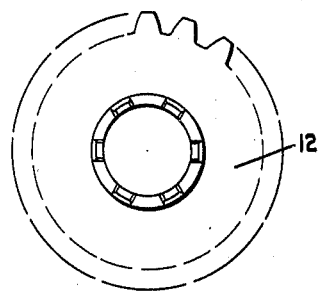
Figure 3 shows an elevation of the gear which forms a part of my improved brake mechanism.
Figure 4:
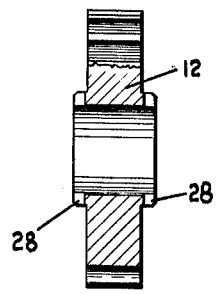
Figure 4 shows a vertical sectional view of the gear shown in Figure 3.
Figure 5:
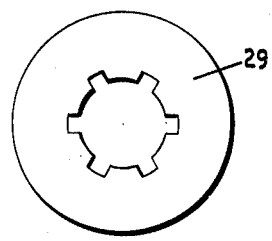
Figure 5 shows an elevation of one of the friction discs used in connection with my improved brake.
Figure 6:
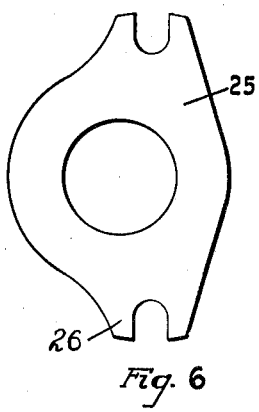
Figure 6 shows an elevation of the co-operating friction disc member used in connection with my improved clutch.
Figure 7:
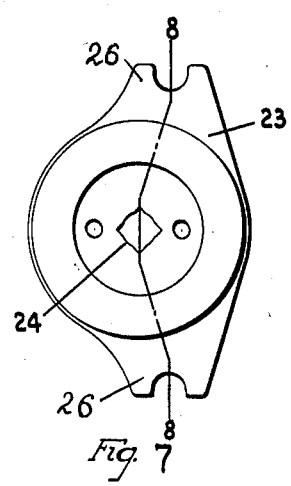
Figure 7 shows a non-rotatable friction member which is used for applying the pressure to my improved brake in elevation.
Figure 8:
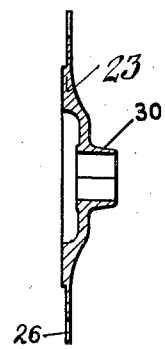
Figure 8 shows a sectional view taken on the line 8—8 of Figure 7.

Referring to the accompanying drawings, I have used the reference numeral 10 to indicate generally a transverse partition or web which extends across a transmission housing between the clutch and the primary shaft of the transmission mechanism. This web serves the dual purpose in the transmission of forming the support for the primary and secondary shafts of the transmission and of bracing the transmission housing. It also forms a support for a sleeve 11 which extends into the transmission to form the bearing or journal upon which the reverse idler gear 12 is journaled. It will be noted that the reverse idler gear 12 is loosely mounted on this sleeve 11 so that the gear may either rotate or slide longitudinally of the sleeve. The reverse idler gear 12 meshes with a pinion 13 which in turn is connected to a shaft 14 which is positively connected to the rear wheels of the vehicle upon which this transmission is mounted. It will, therefore, be seen that rotation of the rear wheels will cause the reverse idler gear 12 to rotate and conversely if the gear 12 is held from rotation, then the rear wheels will also be held from rotation.

A lever 15 is pivoted at 16 and operatively connected at 17 with a clutch device 18 so that movement of the lower end of the lever rearwardly will disengage the clutch and forwardly will cause the clutch to engage. This clutch 18 is the clutch ordinarily provided in connection with transmission for the purpose of disconnecting the transmission from the engine.

My invention consists in the connection of this clutch controlling lever 15 with a brake mechanism which is in turn associated with the reverse idler gear 12 whereby movement of the clutch lever in a direction to throw the clutch may be continued until such movement will also cause the brake mechanism to retard or stop the movement of the reverse idler gear 12, thereby in turn stopping the movement of the rear wheels of the vehicle.

With the exception of the sleeve 11, which has heretofore been described and the loose mounting of the reverse idler gear on this sleeve, the parts heretofore described are of ordinary construction at least in connection with the transmission of one type of tractor which is in commercial use and are shown in my patent above mentioned. They are not, therefore, described with greater detail as their operation may be readily discovered by anyone referring to said patent.

My invention also consists in the manner of connecting my brake mechanism to the reverse idler gear in the brake mechanism itself, and of inter-connecting these parts with the clutch lever 15.

As has heretofore been described, the reverse idler gear 12 is mounted on the sleeve or hollow shaft 11, and a shaft 19 is in turn loosely received to permit longitudinal movement within the hollow shaft 11. This shaft 19 has a shoulder 20 formed at its forward end and an extension 21 has an upturned stop 22 formed at the forward end thereof. The rear end of the shaft 19 is squared to receive the pressure applying friction member 23. This pressure applying member 23 has a correspondingly squared opening 24 to receive the shaft 19 and bears against shoulders 35 at the ends of the squared portion so that the minimum distance between the member 23 and the shoulder 20 will be fixed.

Sheet metal friction members 25, similar to those used in friction disc clutches and similar in shape to the member 23, are non-rotatably mounted on the partition 10. This is accomplished by extending notched ears 26 from either side of these friction discs 25 which receive pins 27 which in turn are secured in the partition 10 and extended to position to loosely support the discs 25 and the pressure applying member 23.

The reverse idler gear 12 has a notched hub 28 extended from either side thereof which supports and holds from rotation friction disc members 29 which have correspondingly notched central openings. A pair of the sheet metal discs 25 are mounted on one side of the reverse idler gear 12 with one of the discs 29 therebetween. At the opposite side of the reverse idler gear a single disc 25 is mounted with a disc 29 next to it and the pressure applying member 23 next to the disc 29. From the foregoing description it will be seen that if the pressure be applied to press the friction members together then that the discs 25 and member 23 will tend to hold the discs 29 and reverse idler gear 12 from rotation.

The pressure applying member 23 has a hub 30 extended rearwardly therefrom to form a supporting sleeve for the end of a coiled spring 31 which in turn bears against an adjustable nut 32 at the end of the shaft 19.

From the construction of the parts heretofore described it will be seen that the spring 31 will normally hold the pressure applying member 23 against the shoulders 35 on the shaft 19 so that the distance between these parts may be made such that there will be no pressure applied to the friction faces of the brake members when the parts are in this position. If, however, the shaft 19 be moved forwardly and longitudinally through the sleeve 11, then the spring 31 will apply a pressure corresponding to the compression on the spring 31 against the pressure applying member 23 to thereby compress the friction members of the brake between the pressure applying member 23 and the partition 10. The pressure so applied can be regulated by the movement of the shaft 19 and limited by the compression placed upon the spring 31 by the positioning of the nut 32. The shaft 19 may be moved forwardly by extending the lever 15 down below its connection with the clutch 18 to position opposite the stop 22 so that an adjustable screw 33 may be brought into contact with the stop 22 when the lever 15 has been moved to position to throw the clutch 18 out of engagement. This screw 33 permits adjustment of this contact so that the contact will occur at the right time and the stop (not here illustrated) for the lever 15 will prevent movement of that lever a sufficient distance to cause the shaft 19 to compress the spring 31 an amount sufficient to damage the spring 31. When the lever 15 has been moved the proper distance to operate the brake mechanism, then releasing the pressure on the spring 31 will return the shaft 19 rearwardly along the sleeve 11 until the shoulder 20 contacts with the forward end of the sleeve 11 so that the parts will then be in position again where there will be no compression on the friction members of my improved brake.

Among the many advantages arising from the use of my improved construction, it should first be pointed out that it is adaptable for a commercial structure now in use without largely altering the present construction of that vehicle. It might also be quite readily applied to vehicles of the same type which have heretofore been manufactured as a replacement or accessory. It is also of such a nature that it may be mounted inside the transmission where it is exposed to the oil and grease of the transmission without the efficiency of its operation being marred. It may also be operated by one of the levers provided in connection with ordinary transmissions so that no additional operating levers are made necessary by the use of my improved brake mechanism and the operation of the brake with the levers already provided is a natural operation, that is, the operator would naturally make the necessary movements essential to operate the brake.

A further advantage resulting from the use of my improved brake is that the parts are so constructed that they will last practically the life of the ordinary transmission and that adjustments are very seldom, if ever, required.

I claim as my invention:

1. In a brake mechanism for transmissions having a gear operatively connected with a driven shaft and an operating lever for the transmission, brake mechanism associated with said gear and means for operatively connecting said mechanism with the operating lever whereby movement of said lever beyond a pre-determined point will operate said brake mechanism.

2. In a transmission having driving gears therein, means for loosely mounting one of said gears to permit rotation and longitudinal movement thereof, and brake mechanism associated with said gear whereby movement of said gear may be retarded or prevented to thereby slow or stop the vehicle upon which the transmission is mounted.

3. In a brake mechanism adapted to be associated with a transmission for vehicles having a gear therein with a permanent driving connection with the wheels of the vehicle and a clutch device for connecting the transmission with the motive force of the vehicle and a control lever for operating said clutch, a brake mechanism operatively connected with said gear and means for operatively connecting said control lever with said brake mechanism whereby the brake mechanism can only be actuated by said control lever when the clutch is disengaged.

4. In a transmission brake, a partition member, a sleeve mounted in said partition member and extending therefrom, a gear loosely mounted on said sleeve, a shaft slidably mounted therein, a pressure applying member slidably but non-rotatably mounted on said shaft, means for yieldingly urging the pressure applying member in one direction longitudinally of said shaft, friction applying members associated with said pressure applying member and the partition and the gear, and means for moving the shaft longitudinally to apply said yielding pressure to said friction members to thereby retard or stop the movement of said gear.

5. In a transmission brake a partition member having an opening therein and a sleeve extended therefrom, a shaft slidably mounted in said sleeve and opening, a gear loosely mounted on said sleeve for rotation or sliding movement, a pressure applying member non-rotatably mounted on the end of said shaft adjacent to the gear, means for yieldingly urging said pressure applying member toward the gear, means for limiting the movement of said pressure applying means on the shaft in said direction, and means for limiting the movement of said shaft in a direction to carry the pressure applying means away from said gear whereby the pressure applying means will normally apply no pressure to said gear but movement of the shaft in one direction may apply such pressure through said yielding means.

HENRY FORD.